2,844,587

CARBOXYHISTADYL AND ANALOGS

Edgar A. Ferguson, Jr., Brooklyn, N. Y.

No Drawing. Application January 14, 1957
Serial No. 633,843

5 Claims. (Cl. 260—294.8)

The present invention relates to compounds which are carboxy derivatives of histadyl and its analogs. The carboxy group is placed in a position which relates it to nicotinic acid. The histadyl compound consists of a pyridyl thienyl ethylene diamine salt or its analogs.

The class of compounds (histadyl and thenfadil) which are the subject of the present invention may be classified generically as carboxy pyridyl methyl thienyl ethylene diamines.

It is the purpose of this invention to describe a new antihistaminic compound. It is a further purpose to describe a compound with soporific effects. Still another purpose is to describe the method of synthesis of two specific compounds belonging to the said classification. The specific compounds being carboxy histadyl, (methapyrilene derivative), NN, dimethyl N' 2 (5 carboxy pyridyl) N' 2 methyl thienyl ethylene diamine and (the carboxy thenfadil derivative) NN dimethyl N' 2 (5 carboxy pyridyl) N' 3 methyl thienyl ethylene diamine.

Further objects of this invention will appear from the reading of the specifications and claims. The following description embodies the synthesis and the theory of the chemical reactions involved in the formation of the products described. It is not intended that the scope of the invention be limited by the theory developed here and further objects and methods of utilization together with substitutes for the synthetic processes of the formation of the product of this invention will appear to those skilled in the art. The following description is therefore to be used merely as a guide in delineating the method of synthesis and the scope and spirit of the invention.

Example 1

The following is a synthesis in which the 5 carboxy group has been introduced into the pyridine ring of methapyrilene.

The alpha amino pyridine is brominated. The amino group orients the bromine ortho and para to the said amino group. It should be noted that the amino group of the amino pyridyl radical has two ortho positions. One of them however is occupied by the nitrogen. This is position one, the other ortho position is not blocked and is free and therefore it is one of the positions in which bromination occurs. This position is position number 3.

From this bromination two products are formed. One is ortho bromo amino pyridine and the other is para bromo amino pyridine. The ortho derivative is 3 bromo 2 amino pyridine and the para derivative is 5 bromo 2 amino pyridine.

The bromination reaction is best carried out in a basic solution such as pyridine itself.

Because the amino pyridine has a nitrogen group in the ortho position there is restricted bromination in the opposite ortho position and therefore very few of the molecules become so brominated. The majority of the reaction is bromination in the position para to the amino group. Fractional crystallization or distillation is used to purify and thus yield over 70% of the bromo amino pyridine with the bromine molecule in the 5 position, para to the amino group.

The 2 amino 5 bromo pyridine is reacted with beta di methyl amino ethyl chloride.

This reaction is carried out in toluene with excess sodamide as a catalyst. The following are the conditions of the reaction. Use 5.84 mols of sodamide in 610 cc. of dry toluene. This is heated to 100° C. This mixture is then added to 2.92 mols of 5 bromo 2 amino pyridine and 225 cc. of dry toluene. The mixture is heated for 3 hours on a steam bath. It is then treated with 1.5 mols of beta di ethyl amino ethyl chloride hydrochloride. The reaction mixture is heated for 22 hours under reflux conditions. It is then cooled and washed with water. The toluene layer is separated. The water layer is saturated with potassium carbonate and extraced three times with ether. The ether extract is then added to the toluene. This is then distilled in a Claison flask until the excess 2 amino 5 bromo pyridine (which is approximately 130 grams) has been removed (distilled off). The reaction may be carried out at atmospheric pressure. The residue is fractionated at 112–115° C. at 4 mm. of mercury. The yield is approximately 222 grams of distillate in an iced receiver. The distillate is NN di methyl N' (2 (3 or 5 bromo pyridyl)) ethylene diamine.

The above compound is condensed with 2 chloro metho thiophene.

The condensation must take place in the presence of sodium ethylate and is refluxed for a period of 2 hours.

The condensate is methapyrilene with bromine in the 3 or 5 position of the pyridine group.

The brominated methapyrilene, product of the reaction, is reacted with sodium cyanide under reflux conditions in an anhydrous solvent with a slightly basic character (accomplished by utilizing a trace of pyridine).

Sodium bromide is therefore split out from the molecule and a cyanide group now occupies the position formerly held by the bromine. This cyanide substituted compound is then hydrolyzed with water and dilute acid under reflux conditions.

This fiinal reaction forms NN dimethyl N' 2 (5 carboxy-pyridyl) N' 2 methyl thienyl ethylene diamine.

Example 2

Example 1 is followed up to the formation of the brominated methapyrilene. This is treated with magnesium metal in the presence of dry iodine as a catalyst in dry ether as a solvent. This makes the substituted aryl magnesium halide (pyridyl halide). This product is then mixed with dry ice in an appropriate container and stirred. This forms the acid with the by-product magnesium bromide.

Example 3

Instead of waiting until the point in the synthesis where brominated methapyrilene is made which is then converted to an acid, it is possible to start with the carboxy acid. That is, to take the amino pyridine, brominate it, to form bromo amino pyridine, then immediately convert into the acid by any of the methods indicated above, that is by refluxing with sodium cyanide or by making the magnesium halide, etc., then following the same series of reactions indicated in Example 1 except that the acid forming process is not now required. This method utilizes as a starting substance 2 amino 3 or 5 carboxy pyridine (amino nicotinic acid). The result of this synthesis is the same as in Example 1.

Example 4

The synthesis of Example 1 is followed except that 3 thienyl methyl chloride or 3 thienyl chloride is used.

The result of this synthesis is NN dimethyl N' (alpha 3 carboxypyridyl) N' 3 methyl thienyl ethylene diamine.

The above examples are recited for the purpose of amplifying the description of the product and showing possible methods of preparation. These examples are not intended to restrict the specification and claims.

What is claimed is:

1. A compound selected from the group consisting of 2-[(2-dimethylaminoethyl) - 2 - thienylamino] - pyridine-3-carboxylic acid; 2-[(2 - dimethylaminoethyl) - 2 - thienylamino]-pyridine-5-carboxylic acid; 2-[(2-dimethylaminoethyl)-3-thienylamino] - pyridine - 3 - carboxylic acid; and 2-[(2 - dimethylaminoethyl) - 3 - thienylamino]pyridine-5-carboxylic acid.

2. 2-[(2-dimethylaminoethyl) - 2 - thienylamino]-pyridine-3-carboxylic acid.

3. 2-[(2 - dimethylaminoethyl) - 2 - thienylamino]-pyridine-5-carboxylic acid.

4. 2-[(2 - dimethylaminoethyl) - 3 - thienylamino]-pyridine-3-carboxylic acid.

5. 2-[(2 - dimethylaminoethyl) - 3 - thienylamino]-pyridine-5-carboxylic acid.

References Cited in the file of this patent

UNITED STATES PATENTS 2,581,868    Kyrides _____ Jan. 8, 1952